(12) United States Patent
Cosban

(10) Patent No.: US 7,137,757 B1
(45) Date of Patent: Nov. 21, 2006

(54) METHOD AND DEVICE FOR REPAIRING OR REINFORCING AN UNDERGROUND PIPE

(76) Inventor: William C. Cosban, 1606 Sycamore Pl., Schaumburg, IL (US) 60173

( * ) Notice: Subject to any disclaimer, the term of this patent is extended or adjusted under 35 U.S.C. 154(b) by 0 days.

(21) Appl. No.: 11/122,814

(22) Filed: May 5, 2005

(51) Int. Cl.
*F16L 55/18* (2006.01)

(52) U.S. Cl. .............................. 405/184.2; 405/184.1; 138/97

(58) Field of Classification Search ............. 405/184.2, 405/184.1; 138/97
See application file for complete search history.

(56) References Cited

U.S. PATENT DOCUMENTS

| | | |
|---|---|---|
| 3,895,652 A | 7/1975 | Zach |
| 4,011,620 A | 3/1977 | Southgate |
| 4,429,720 A | 2/1984 | Beck et al. |
| 4,440,194 A | 4/1984 | Kinumoto et al. |
| 4,589,447 A | 5/1986 | Kane et al. |
| 4,647,072 A | 3/1987 | Westman |
| 4,678,370 A * | 7/1987 | Allen ...................... 405/184.2 |
| 4,911,193 A | 3/1990 | Smith |
| 5,101,863 A | 4/1992 | Fujii et al. |
| 5,224,516 A | 7/1993 | Mcgovern et al. |
| 5,427,154 A * | 6/1995 | Stephens .................... 138/98 |
| 5,443,097 A | 8/1995 | Pfeiffer |
| 5,560,395 A | 10/1996 | Bissonnette |
| 5,700,110 A * | 12/1997 | Kamiyama et al. ...... 405/184.2 |
| 5,816,293 A | 10/1998 | Kiest, Jr. |
| 6,135,748 A | 10/2000 | Steketee, Jr. |
| 6,152,186 A | 11/2000 | Arney et al. |
| 6,240,965 B1 * | 6/2001 | Maimets ...................... 138/98 |
| 6,701,966 B1 | 3/2004 | Higman |
| 6,796,334 B1 | 9/2004 | Ishikawa et al. |
| 6,827,109 B1 | 12/2004 | Mc Caughty |
| 6,935,376 B1 * | 8/2005 | Taylor et al. ................. 138/98 |
| 2003/0178083 A1 | 9/2003 | Mc Caughtry |
| 2004/0173272 A1 | 9/2004 | Yoo et al. |

FOREIGN PATENT DOCUMENTS

| | | | |
|---|---|---|---|
| GB | 2088516 A * | 6/1982 | |
| WO | WO 9215818 A1 * | 9/1992 | |

* cited by examiner

*Primary Examiner*—Frederick L. Lagman
(74) *Attorney, Agent, or Firm*—Mathew R. P. Perrone

(57) ABSTRACT

A method for reinforcing or repairing a pipe pulls a liner assembly with a flexible smooth bore liner and a semi-rigid helix that gives non-collapsible characteristics within the damaged pipe for both linear pipe sections and curved pipe sections. The existing pipe is first cleaned with a specially designed brush with two wooden spheres at each end of the brush to prevent snagging or jamming during brush operations. The liner assembly is then pulled through the total length of the pipe and anchored at each end with retaining sleeves, which are sandwiched and glued within the liner assembly and the inside diameter of the existing pipe.

14 Claims, 16 Drawing Sheets

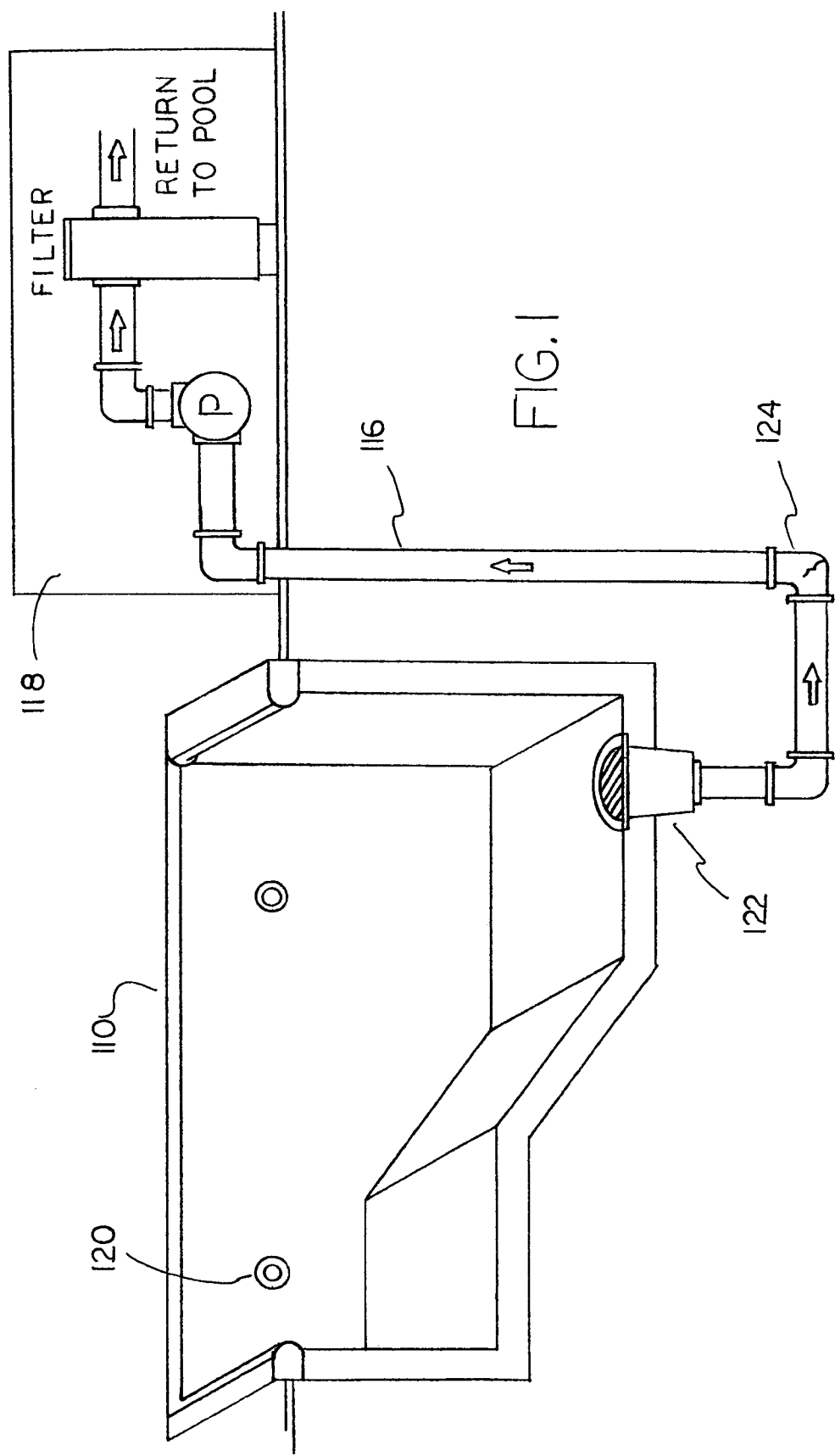

220

220

220

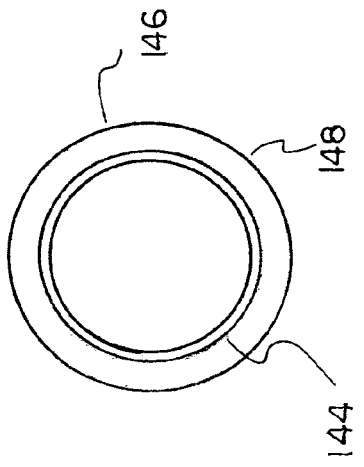
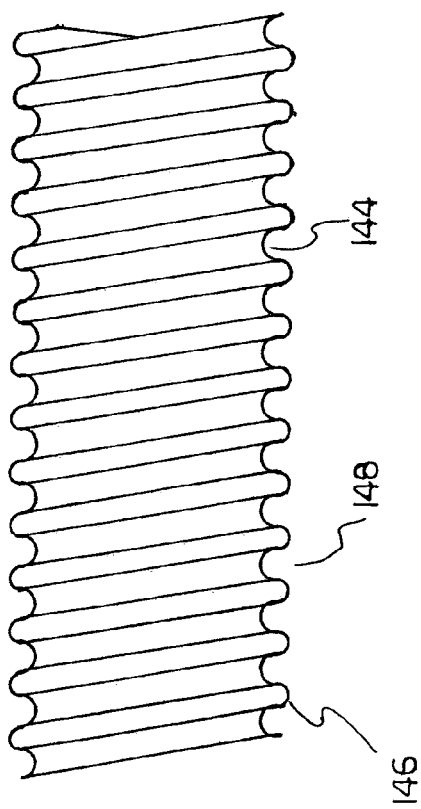
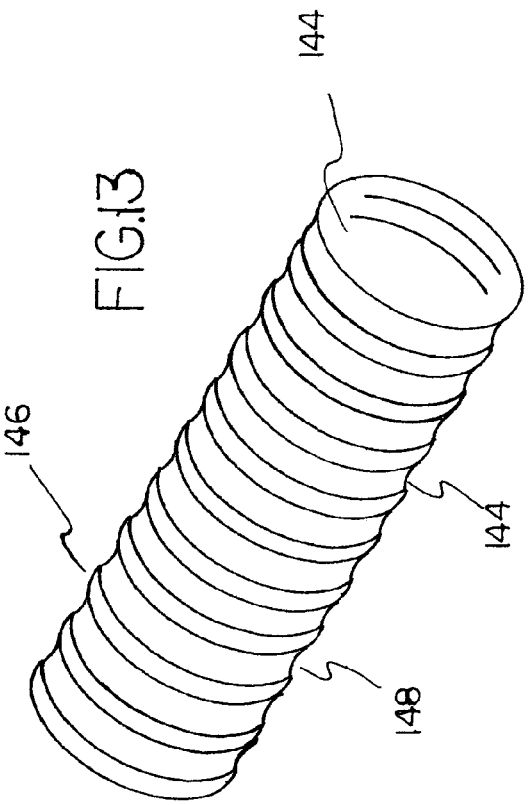

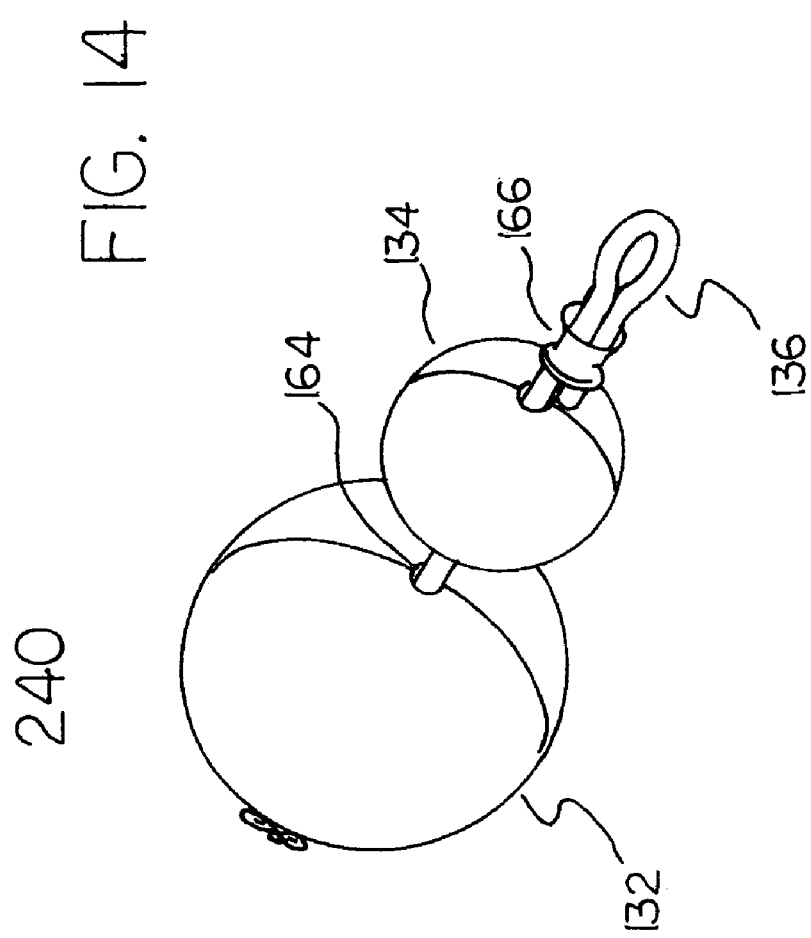

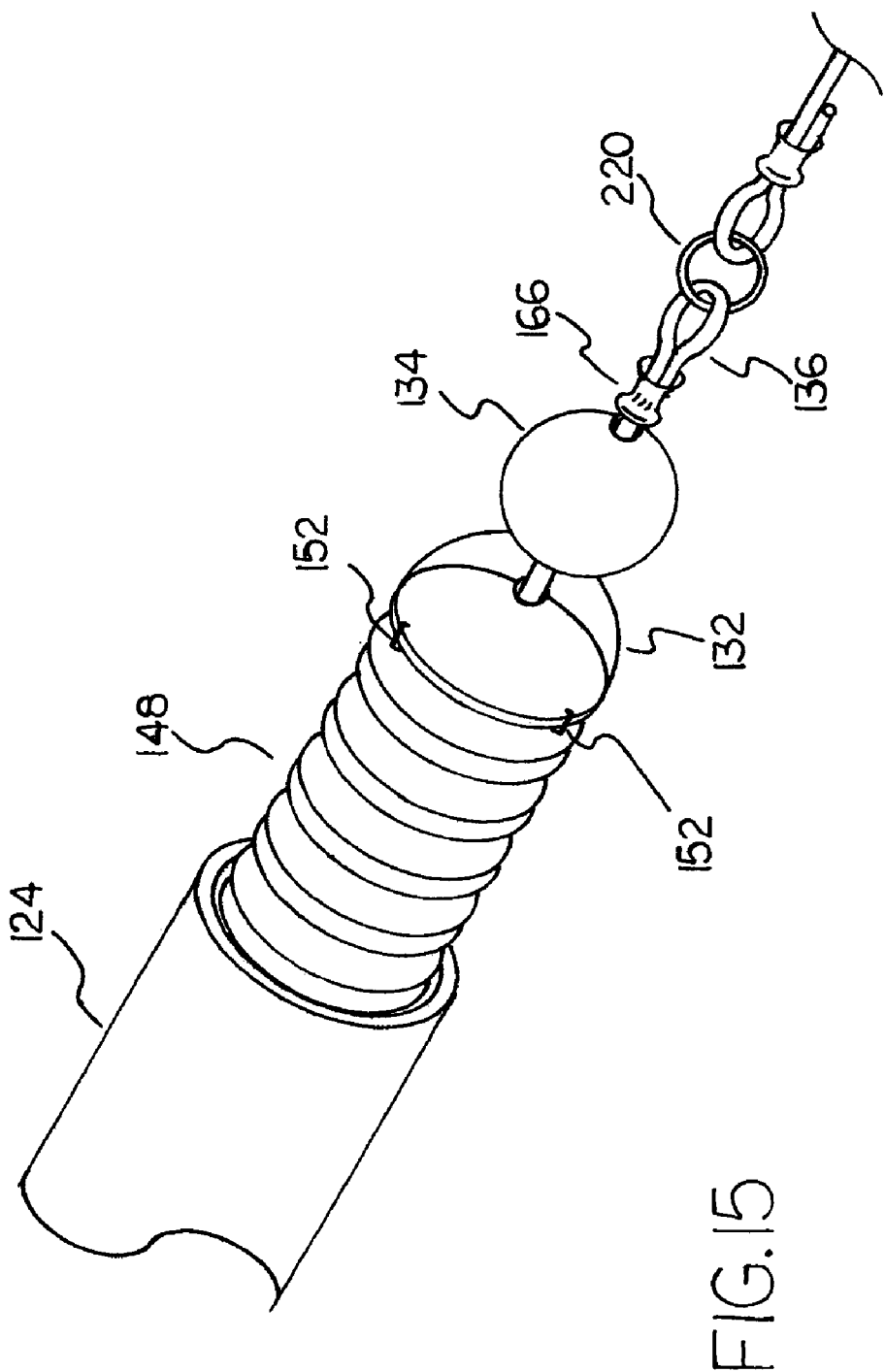

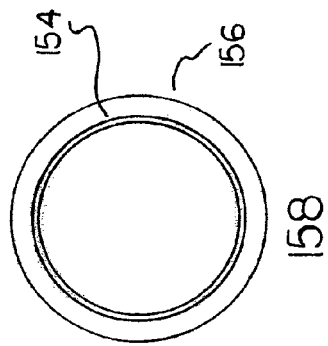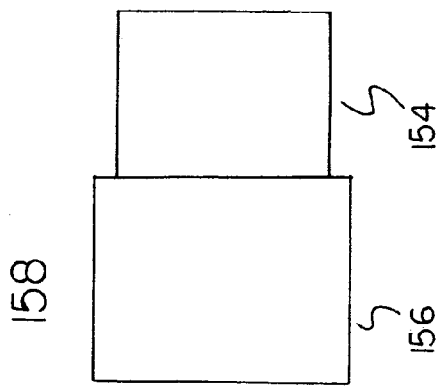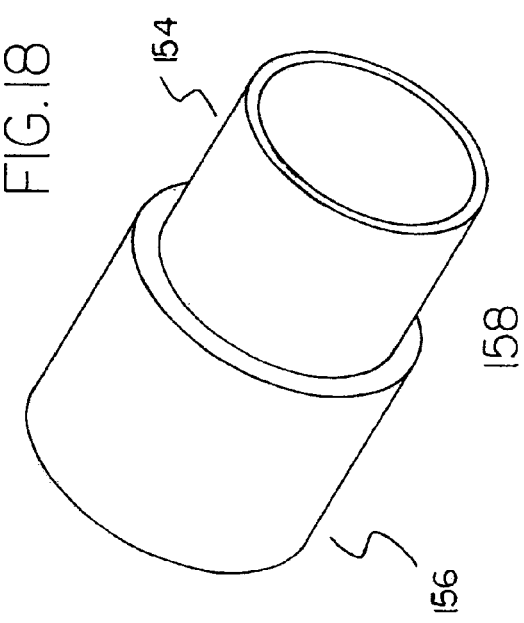

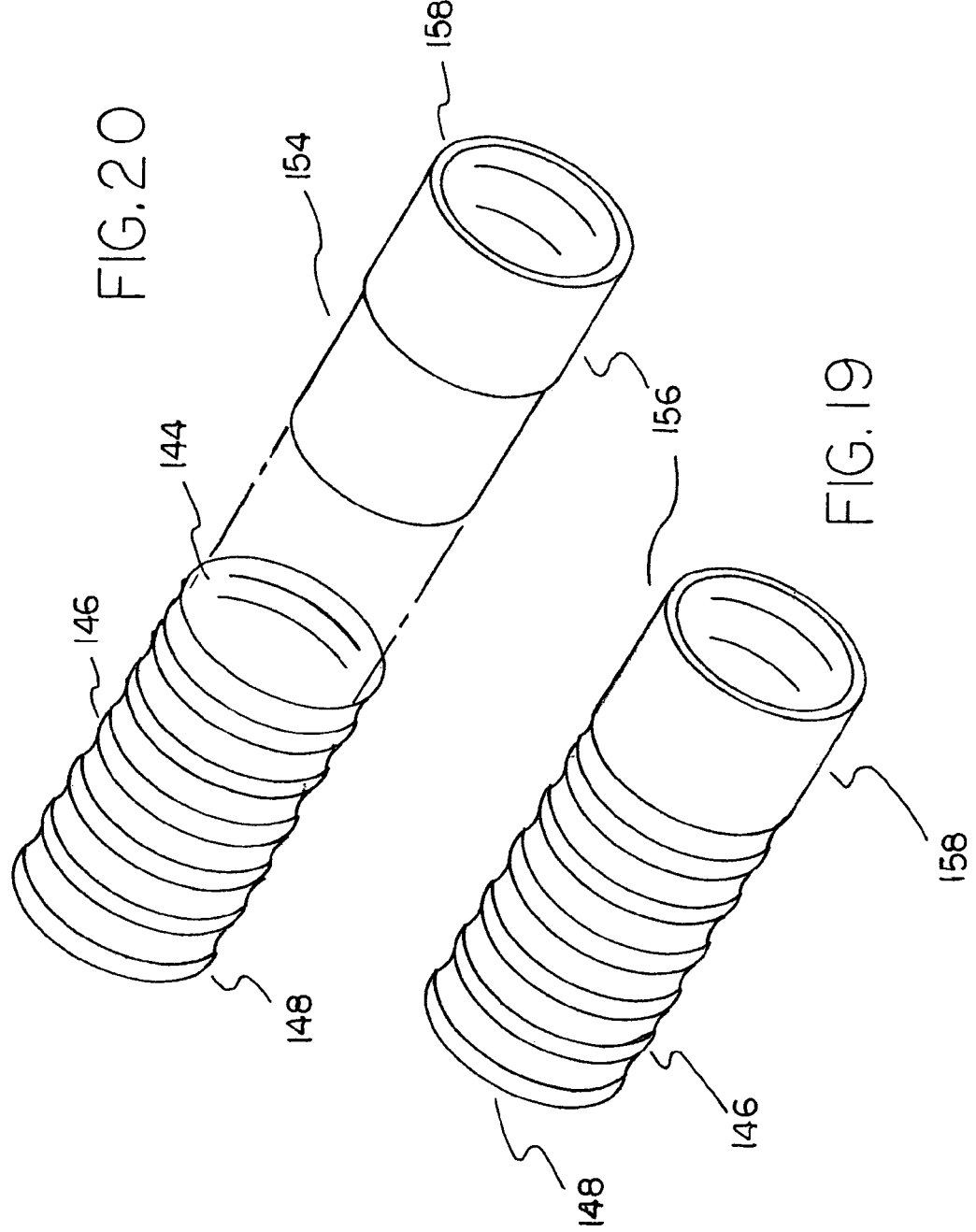

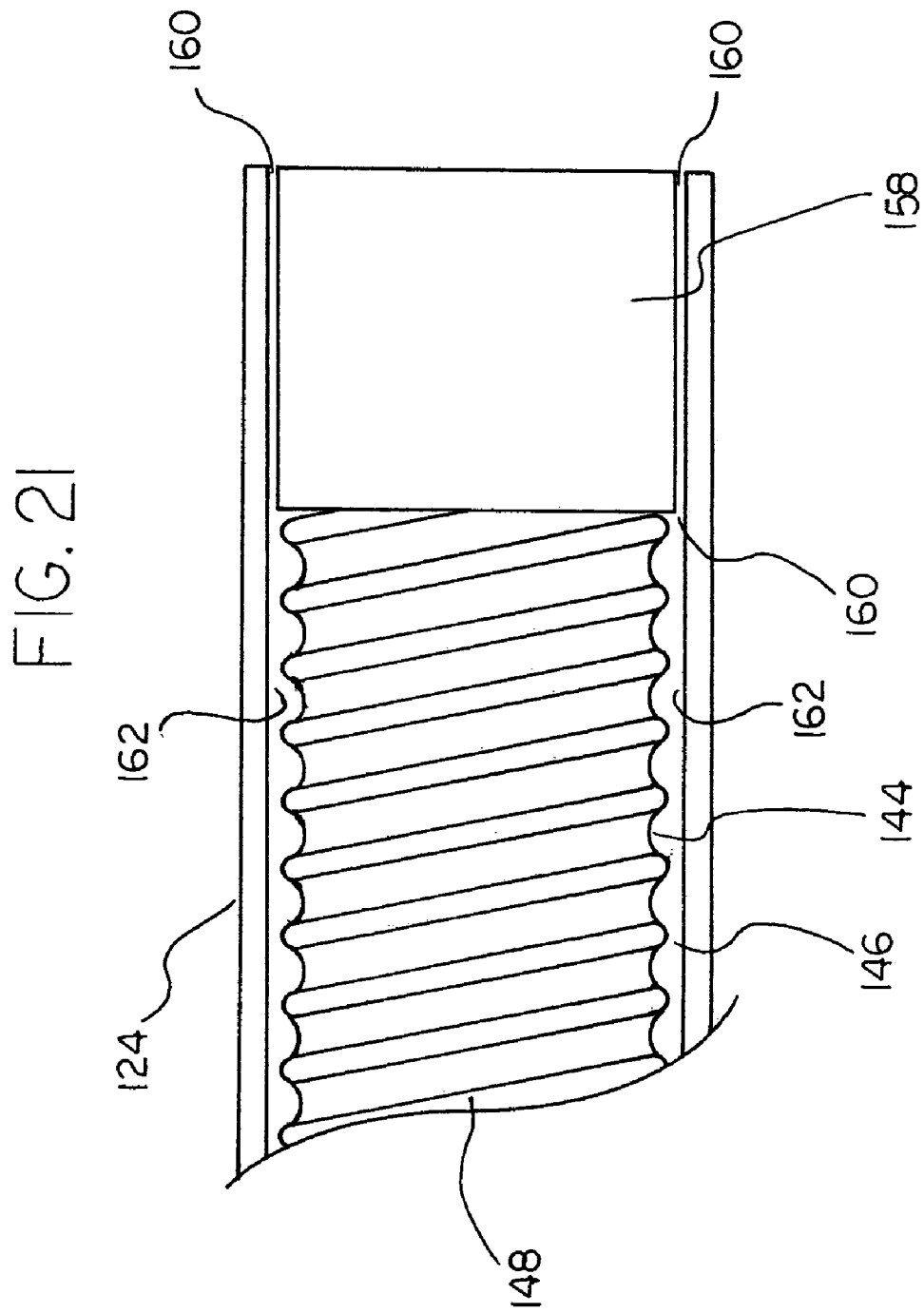

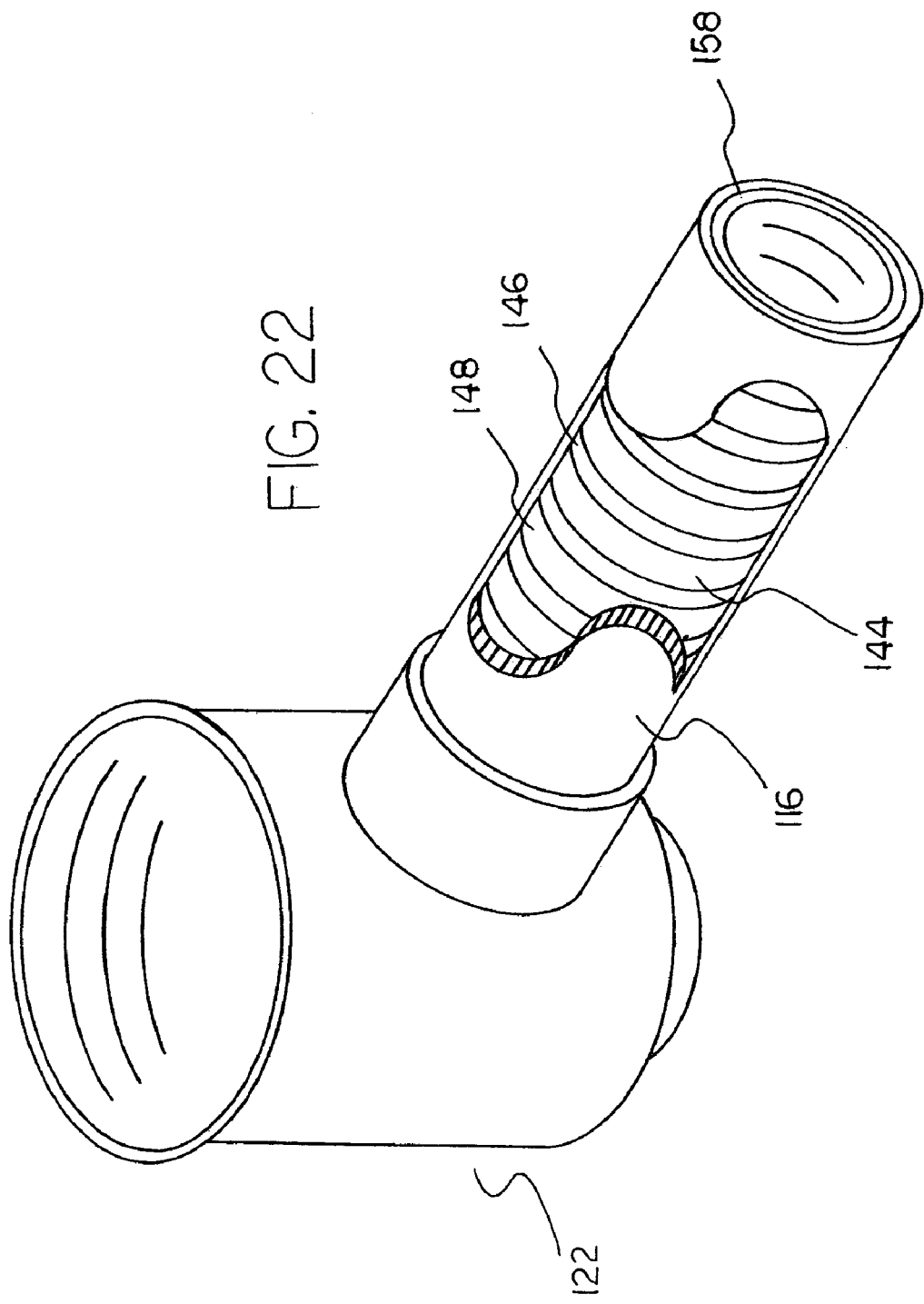

METHOD AND DEVICE FOR REPAIRING OR REINFORCING AN UNDERGROUND PIPE

This invention relates to a method and device for repairing or reinforcing an underground pipe, and more particularly, to a method and device for repairing or reinforcing an underground pipe with minimal, or no excavation.

BACKGROUND OF THE INVENTION

After years of use, many devices which require water can suffer leaks in the supply pipes, which bring water supply to the area. Typically, the supply pipes are underground pipes. Due to age, the intrusion of roots, placement of heavy loads and shifting of the earth above and around existing piping or a variety of other reasons, underground piping can become damaged, requiring this repair for the resulting leaks. This makes repair thereof difficult. While repair may be accomplished by excavating, removing and replacing the total existing pipe or only damaged sections of the pipe; such procedures are either very time consuming, expensive or even impossible to perform.

As can be seen from FIG. 1, underground polyvinyl chloride piping or plastic specifically used for the circulation of pool water, chiefly the underground main piping system 116 located at the bottom, a deep end of the pool 110, has a tendency to leak during years of operation. These pipes range in sizes with inside diameters of usually 1.5 inches, 2 inches, 3 inches and 4 inches and are imbedded from under the pool bottom, or its adjacent sides (skimmers) to the pump and filter units. Conditioned pool water returns to the pool 110 through the underground main piping system 116 and exits through water jet outlets 120 built below the water line located in the poolside walls. These units are usually housed within a building structure fitted with or without a foundation and with or without concrete flooring 118. Another obstacle is the location of the pool 110 itself. Pools on top or within buildings are unable to be excavated or to use excavating equipment to get to and replace the existing piping 124, which leaks.

During initial construction, a main drain water inlet 122 was built into the deepest section of the pool 110. The main drain water inlet 122 connects one of the underground main piping system 116 needed to transport pool water for proper circulation of chemically treated, heated (if the pool 110 is equipped with a pool heater), and filtration for pool water clarity. Skimmers (not shown) are located in the pool walls partially submerged at the water line to skim any debris from the pool water surface and to transport the debris and water it ingests to the pump house 118 through underground return lines. These lines are also susceptible to leakage. The pump house 118 heats, filters, and chlorinates the water and returns the conditioned water back to the pool 110 through other underground piping (not shown). This return piping is also susceptible to leakage while exiting through wall mounted outlet jets 120 located in the sides of pool 110 below the water line.

Hot tubs and Jacuzzis also have potential pipe leakage problems that take extensive time, labor and materials to repair such leaks including the renovation of the surrounding area to its original state. It thus becomes critical to simplify this repair process.

Natural gas pipes made of galvanized, metal pipe are also a major problem. The interior of the galvanized pipe corrodes relatively quickly upon contact with the gas being transited. A large build-up of corrosion restricting gas flow is not uncommon. This restricted gas flow elicits a safety hazard. The initial demand for gas from a restricted gas line has the tendency to starve off and snuff out gas pilot lights located in appliances such as ovens, stoves and gas water heaters without the knowledge by the user of the pilot being extinguished. The present process to repair this quandary is to insert a straight rigid plastic sleeve into the existing pipe. The difficulty exists if there is the slightest turn or bend in the pipe being repaired. At that locality, the existing pipe has to be excavated in order to be repaired.

It is not uncommon for electricians to bury plastic (Polyvinyl chloride) pipe ranging from 1.5 inches to four inches in inside diameter to house exposed individual or bundled electrical wiring. At times, high water tables along with damaged pipe containing above-mentioned wiring become submersed or saturated with ground or influent water. This problem can be difficult to solve, even with excavation to access these pipes. Many solutions of the above-mentioned problems have been sought, but no previous solution has been regarded as fully viable.

Previous repair mechanisms mainly repair only straight piping with minimal if any curves. Previous devices, especially to solve this curve problem are too elaborate and mostly consist of expensive machinery, such as abrasive blasting machines, to prepare the existing pipe for liner adhesion. Adhesive, epoxy or resin tanks for mixing and distribution to line the damaged pipe after the sand blasting are mandatory and complicated.

Compressed air along with steam or heat producing machines are also implemented to clean the damaged line or to adhere the resin impregnated liner to the inside diameter of the damaged line after it had been set into place. Curing also has to take place after the impregnation process is complete. This leads to excessive down time and man-hours playing a major role to install resin impregnated liners and other similar systems.

Another usual method of repair is therefore still to excavate the damaged area or the total length of the damaged pipe if able, or to tear down and restore existing structures such as bathrooms or indoor pools and Jacuzzis. This results in great expense and trouble along with down time of the existing unit as the damaged pipe is supporting the day-to-day operations of the existing unit. Thus, any method or device, which minimizes the down time and speeds up the repair offers great advantages.

SUMMARY OF THE INVENTION

Among the many objectives of this invention is the provision of a cleaning device for an underground pipe.

A further objective of this invention is the provision of a flexible repair liner for an underground pipe.

Yet a further objective of this invention is the provision of a substantially non-collapsible repair liner for an underground pipe.

A still further objective of this invention is the provision of a brush head assembly for clearing an underground pipe.

Another objective of this invention is the provision of a wadding mechanism to clean underground pipe.

Yet another objective of this invention is the provision of a method to repair an underground pipe in-place.

Still, another objective of this invention is the provision of a connector for the repair pipe.

Also, an objective of this invention is the provision of a repair system, which greatly reduces the time required to repair an underground pipe.

A further objective of this invention is the provision of a method to reinforce an underground pipe in-place.

Yet a further objective of this invention is the provision of a substantially non-collapsible reinforcing liner for an underground pipe to reinforce the same.

A still further objective of this invention is the provision of a method to provide preventive maintenance for an underground pipe in-place.

Another objective of this invention is the provision of a substantially non-collapsible reinforcing liner for an underground pipe to provide preventive maintenance for the same.

These and other objectives of the invention (which other objectives become clear by consideration of the specification, claims and drawings as a whole) are met by providing a method for reinforcing or repairing a pipe having the steps of pulling a liner assembly with a flexible smooth bore liner and a semi-rigid helix that gives non-collapsible characteristics within the damaged pipe for both linear pipe sections and curved pipe sections. The existing pipe is first cleaned with a specially designed nylon brush with two wooden spheres at each end of the brush to prevent snagging or jamming during brush operations. The liner assembly is then pulled through the total length of the pipe and anchored at each end with retaining sleeves, which are sandwiched and glued within the liner assembly and the inside diameter of the existing pipe.

BRIEF DESCRIPTION OF THE DRAWINGS

FIG. 1 depicts a perspective, partially cross sectioned view of an in ground pool 110 along with section of a damaged underground existing pipe 124.

FIG. 11 depicts a side view of a highly flexible smooth bored plastic (polyvinyl chloride) liner assembly 148.

FIG. 12 depicts an end plan view of a highly flexible smooth bored plastic (polyvinyl chloride) liner assembly 148.

FIG. 13 depicts a perspective view of a highly flexible smooth bored plastic (polyvinyl chloride) liner assembly 148.

FIG. 14 depicts a perspective view of the liner head assembly 240.

FIG. 15 depicts anchoring consisting of three metal staples 152.

FIG. 16 depicts a side view of a polyvinyl chloride (PVC) retainer sleeve 158.

FIG. 17 depicts an end plan view of a polyvinyl chloride (PVC) retainer sleeve 158.

FIG. 18 depicts a perspective view of a polyvinyl chloride (PVC) retainer sleeve 158.

FIG. 19 depicts a perspective view of a retainer sleeve 158 inserted into the pipe liner assembly 148 and joined as one unit.

FIG. 20 depicts a perspective view of a retainer sleeve 158 being inserted into the pipe liner assembly 148.

FIG. 21 depicts a side, partially cross-sectioned plan view of a united pipe liner assembly 148 and retainer sleeve 158 anchored with adhesive sealant 160 inside an existing pipe 124.

FIG. 22 depicts a perspective view of a conventional pool main drain 122 along with an exposed view of an inserted and anchored pipe liner assembly 148 with a repaired pool pipe in the underground main piping system 116.

Throughout the figures of the drawings, where the same part appears in more than one figure of the drawings, the same number is applied thereto.

DESCRIPTION OF THE PREFERRED EMBODIMENTS

This device and method relate to an improvement in the existing pipe repair and methods currently used today in the plumbing and electrical industry for repairing both lateral and angled (elbow) piping. This is accomplished by the insertion of a flexible liner assembly inside the damaged pipe.

A very important use for this method and device can be for preventive maintenance measures or reinforcing purposes. The liner assembly can be inserted into an existing undamaged pipe line that will be housing highly sensitive wiring such as computer or communication usage. The liner assembly can also house hazardous gases or fluids such as radioactive or hazardous materials that are extremely detrimental to humans or the environment.

If there is a breach in the existing pipe line, a detector between the existing pipe line and the previously inserted pipe liner assembly will warn of the breach giving the personnel time to protect the data, or divert to another system or to repair the damaged outer pipe line without disruption of service or loss of gases or fluids whatever the case may be. This redundancy can be used in but not limited to government installations such as military or Federal Aviation Administration facilities such as air traffic control, nuclear power plants or in major industries.

Figure 3:
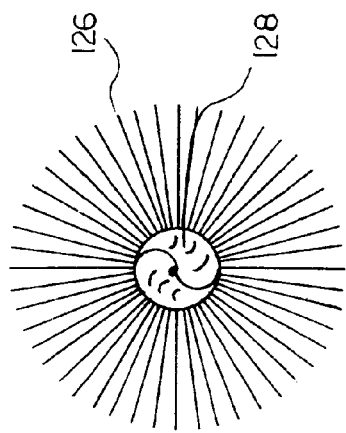
FIG. 3 depicts an end plan view in partial cross section of pipe cleaning brush 114 based on FIG. 2.
Figure 2:
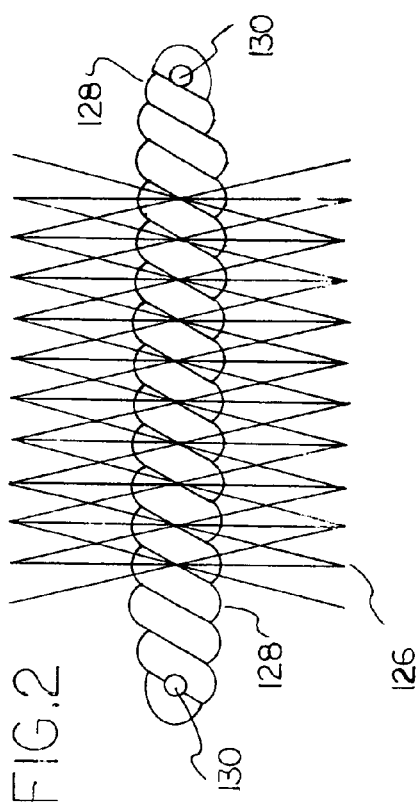
FIG. 2 depicts a side view of a pipe cleaning brush 114.
Figure 8:
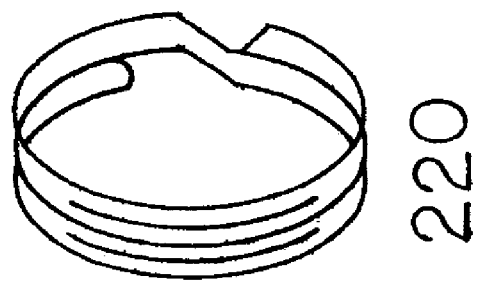
FIG. 8 depicts a perspective view of a connector ring 220 used to connect necessary devices for cleaning, repairing or reinforcing an underground pipe.

Referring now to FIG. 2 and FIG. 3, a side view and an end view of cross sectional view of a pipe cleaning brush 114 is shown. This brush 114 which has a steel mandrel 128 with a 0.125 inch aperture 130 drilled through each end of the mandrel. These drill apertures are used to connect a brush 114 in a head assembly 202 (FIG. 5) by way of a connector ring 220 (FIG. 8).

The bristles 126 are made either of nylon or of metal that varies in stiffness, material, and radius length depending upon the material, and inside diameter of the damaged line. The brush radius is at least 0.125 inch oversized for proper cleaning.

More particularly, the brush radius is up to 115 percent of the radius of the pipe sought to be cleaned. More preferably, the brush radius is up to 110 percent of the radius of the pipe sought to be cleaned. Most preferably, the brush radius is up to 109 percent of the radius of the pipe sought to be cleaned.

This method has the steps of pulling a flexible smooth bore liner 144 (FIG. 11) with a semi-rigid helix 146 wrapped therearound, in order to form liner assembly 148, that gives non-collapsible characteristics within the damaged pipe 124 for both linear pipe sections and curved pipe sections up to and including ninety-degree elbows. The existing pipe is first cleaned with a specially designed nylon brush 114 (FIG. 2) consisting of a sphere 132 (FIG. 5) at each end of the brush 114 (FIG. 9) to prevent snagging or jamming during brush operations. Sphere 132 may be made of any suitable material, such wood, metal or plastic. Wood is preferred.

Cloth swabs 140 (FIG. 4) are subsequently installed at both ends of the brush 114 in order to give the existing pipe 124 a final cleaning. This cleaning of the existing pipe 124 is to remove debris in order for the new liner assembly 148 to move freely within the existing pipe to its full length.

Figure 4:
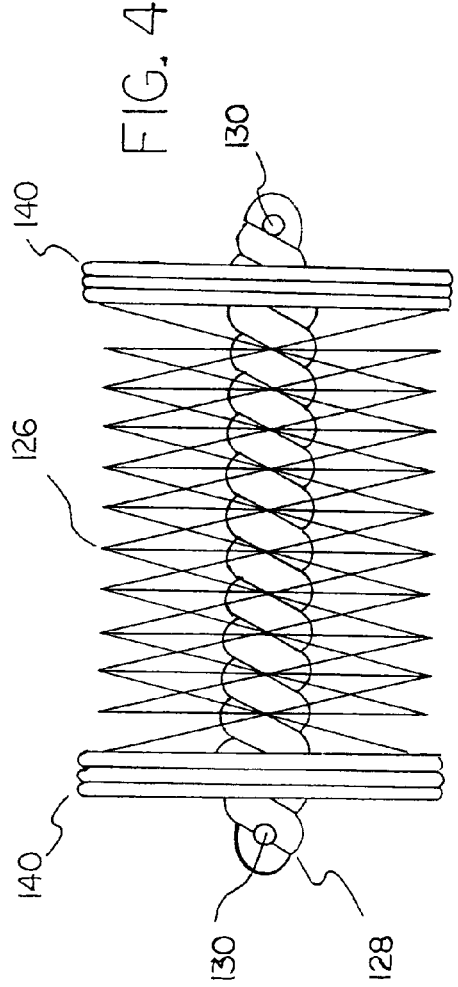
FIG. 4 has pipe cleaning brush 114 except oversized circular cloth cleaning swabs 140 are slipped over the brush mandrel 128 based on FIG. 2.
Figure 5:
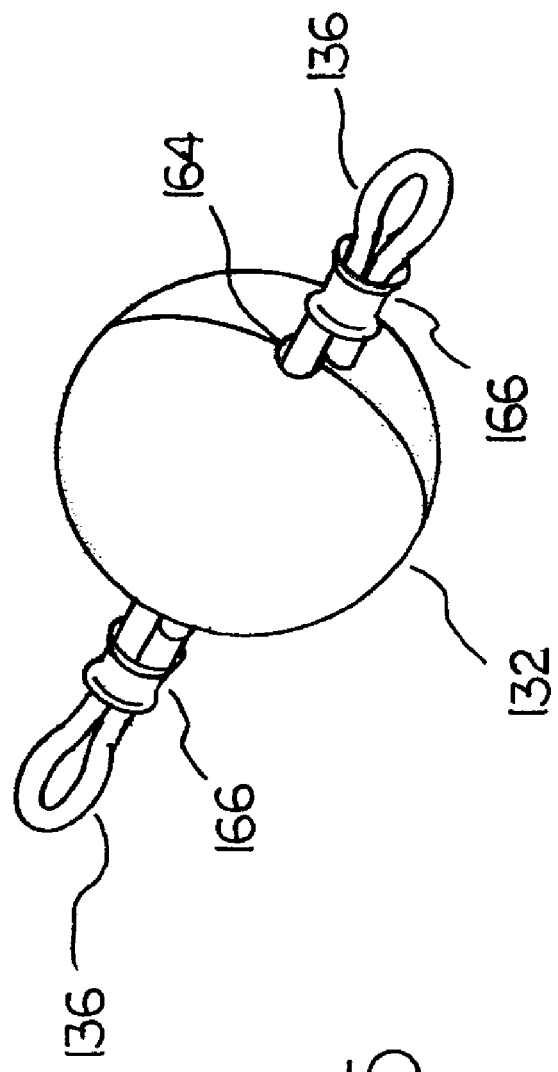
FIG. 5 depicts a perspective drawing of a brush head assembly 202 with a sphere 132 attached thereto.
Figure 7:
FIG. 7 depicts a side view of a connector ring 220 used to connect necessary devices for cleaning, repairing or reinforcing.
Figure 6:
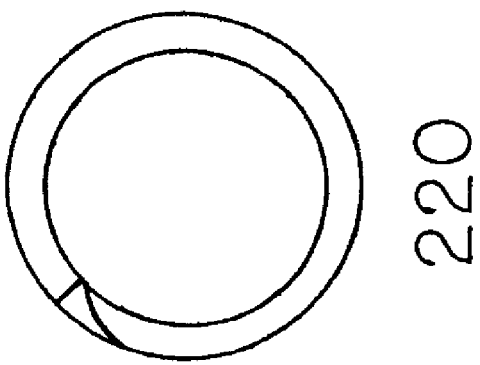
FIG. 6 depicts a top plan view of a connector ring 220 used to connect necessary devices for cleaning, repairing or reinforcing.

FIG. 4 has pipe cleaning brush 114 except oversized circular cloth cleaning swabs 140 are slipped over the brush mandrel 128 and fitted against the brush bristles 126 after disconnecting the head assemblies 202 (FIG. 5) from brush 114 through the connector rings 220 of FIG. 6, FIG. 7 and FIG. 8. These swabs 140 are oversized beyond the cleaning brush bristle radius by a minimum length of 0.125 inch in order to remove any remaining debris that exists after the initial cleaning of the pipe brush.

More particularly, the cloth cleaning swab radius is up to 115 percent of the inside radius of the pipe to be cleaned. More preferably, the cloth cleaning swab radius is up to 110 percent of the of the radius of the pipe. Most preferably, the cloth cleaning swab radius is up to 109 percent of the radius of the of the radius of the pipe.

Figure 10:
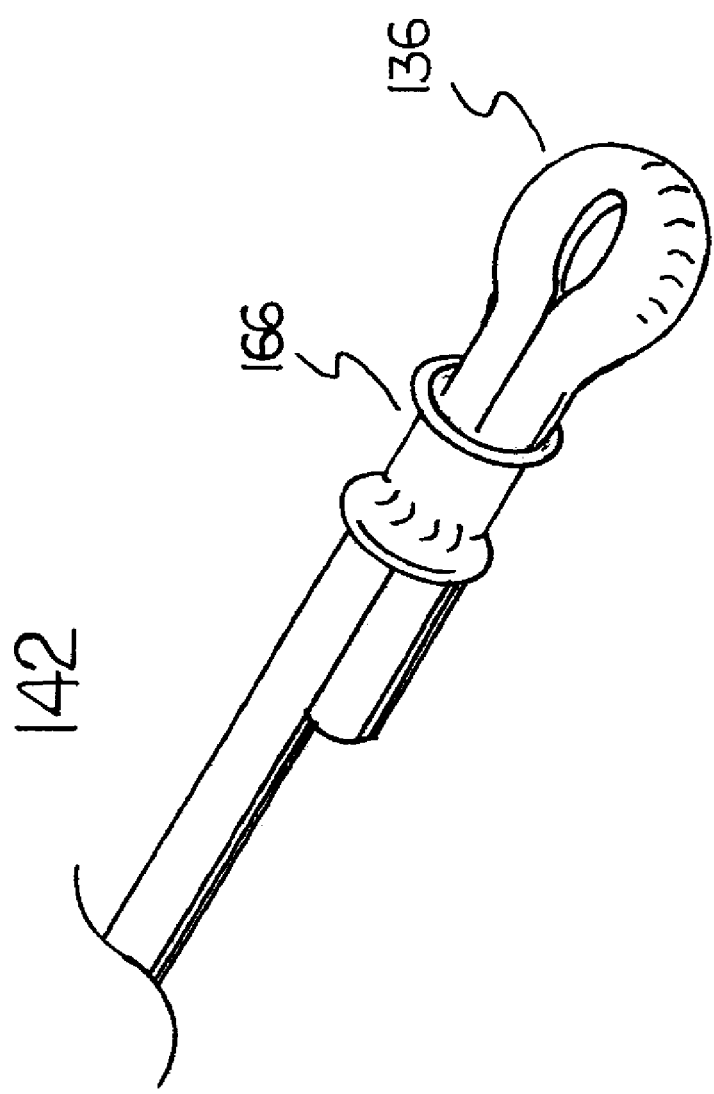
FIG. 10 depicts a perspective view of a nylon pulling cord 142.

Considering now FIG. 5, brush head assembly 202 has a sphere 132 attached thereto. Material for sphere 132 is made of either wood, plastic, metal, nylon, or hard rubber. A pilot aperture 164 is drilled through the center axis of the sphere to accommodate a 0.125 inch diameter nylon cord 142 (FIG. 10). This cord section accommodates a ready-made loop 136 on opposite ends of the sphere. These loops are made with copper crimps 166 to retain its strength and size.

With FIG. 6, FIG. 7 and FIG. 8, connector ring 220 is used to connect necessary devices for cleaning, repairing or reinforcing. These connector rings 220 are used to: (a) Connect a brush head assembly 202 to a pipe cleaning brush 114 FIG. 2, FIG. 3 and FIG. 4; and (b) Connect a nylon pulling cord 142 of FIG. 10 to a brush head assembly 202 of FIG. 5 or a liner head assembly 240 of FIG. 14.

Figure 9:
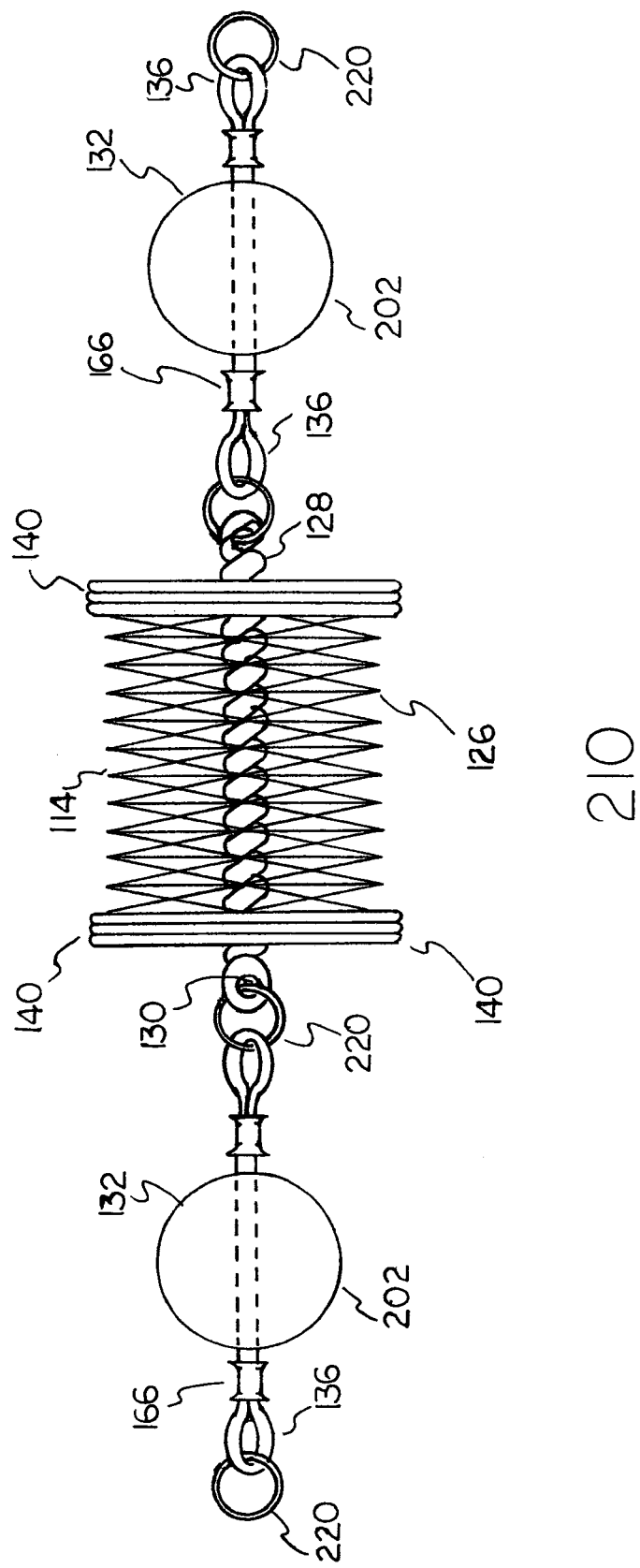
FIG. 9 depicts a sectional view of a pipe cleaning brush 114 with cloth swabs 140 and brush head assembly 202.

FIG. 9 adds pipe cleaning brush 114 with cloth swabs 140, and two brush head assemblies 202 are connected on opposite ends by using two connector rings 220 attaching a nylon cord loop 136 to a mandrel aperture 130 to form a brush system 210.

FIG. 10 shows 0.125 inch diameter nylon pulling cord 142 used in both cleaning, repairing or reinforcing steps. This diameter varies pertaining to the size of the pipe being repaired. For example, a 0.250 inch diameter used for repairing 4.0 inches inside diameter pipe. The end loop or ready made loop 136 is made the same as the loop end used for the brush head assembly 202 and the liner head assembly 240.

For pipe repair FIG. 11, FIG. 12 and FIG. 13 show the repair device using a highly flexible, smooth bored, plastic liner assembly 148. This liner assembly 148 has spherical semi-rigid helix 146 wrapped around a flexible liner 144, that combine to provide a low coefficient of resistance to prevent snags or jamming when the liner assembly 148 is pulled through the pipe 124 being repaired.

The liner assembly 148 is pulled through the total length of the pipe 124 and anchored at both ends with specially designed retaining sleeves 158 shown in FIG. 21, which are sandwiched and glued within the liner assembly 148 and the inside diameter of the existing pipe 124. This process completely seals the inner surface 162 of the existing pipe 124 with the exterior surface of the pipe liner assembly 148 with minimal loss to the inside diameter of the existing pipe 124.

FIG. 14 shows view of the liner head assembly 240. Similar to the make up of the brush head assembly 202, a 0.125 inch diameter nylon cord 142 is passed through the formerly drilled axes of two spheres of different diameters juxtaposed. A knot is formed ending the nylon cord 142 at the larger diameter sphere 132. A loop 136 is formed with the nylon cord 142 at the front of the smaller diameter sphere 134. Larger diameter sphere 132 is inserted and anchored into the inside diameter of the liner assembly 148.

FIG. 15 shows anchoring consists of three metal staples 152 pneumatically stapled approximately 120 degrees from each other through the exterior of the liner 144 while encompassing the helix 146 conclusively driven into the inserted larger diameter sphere 132. The liner head assembly 240 of FIG. 14 is inserted and anchored by galvanized staples 152 into a flexible liner 144. In addition, FIG. 15 illustrates the liner assembly 148 inserted and pulled through an existing pipe 124 with a nylon pulling cord 142.

FIG. 16, FIG. 17, and FIG. 18 shows a polyvinyl chloride (PVC) retainer sleeve 158. This sleeve 158 is specially designed to connect an inserted liner assembly 148 to the inlet and outlet ends of the pipe 124 being repaired. The smaller outside diameter 154 of the retainer sleeve 158 is inserted and adhered into the inside diameter of the liner assembly 148. The large outside diameter 156 of the retainer sleeve 158 is inserted and adhered into the inside diameter of the damaged pipe 124.

FIG. 19, FIG. 20 and FIG. 21 combine to show both pipe liner 144 of liner assembly 148 and retainer sleeve 158 joined as one unit. As retainer sleeve 158 being inserted into the pipe liner 144, it is inserted, anchored, and adhered with adhesive sealant 160 inside an existing pipe 124.

FIG. 22 shows the results of the above figures anchored within conventional pool main drain 122 along with an exposed view of an inserted and anchored pipe liner assembly 148 with a repaired pool pipe 124 in the underground main piping system 116. Thus, effect of the repair to underground main piping system 116 becomes clear as to its efficiency.

Figure 23:
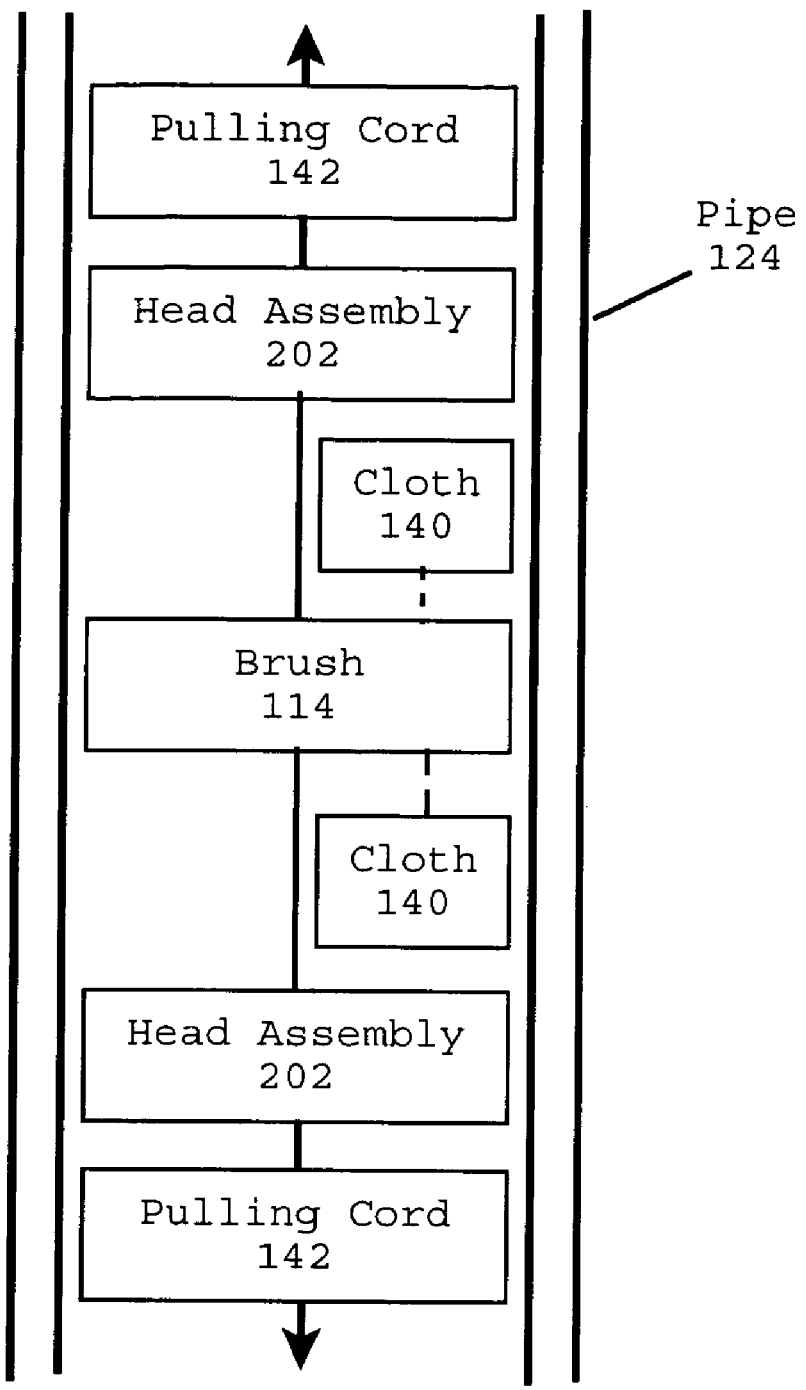
FIG. 23 depicts a block diagram of the cleaning method 100 for an underground pipe of this invention.
Figure 24:
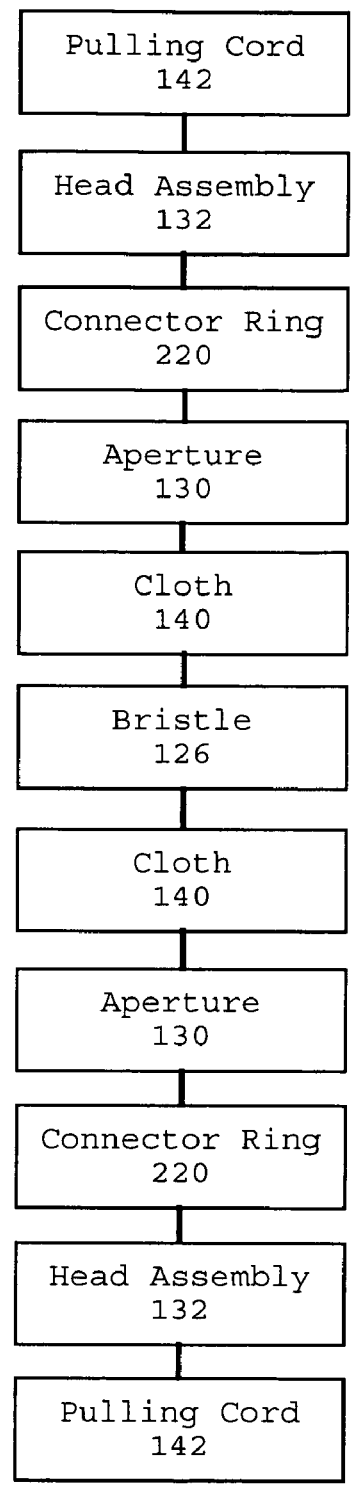
FIG. 24 depicts a block diagram of the cleaning device 200 for an underground pipe of this invention.

Turning now to FIG. 23, a block diagram of the cleaning method 100 for an underground pipe 124 cleaning and finishing. This method has brush 114, which may or may not have cloth 140 attached thereto. A head assembly 202 is attached to each end of brush 114 with a nylon pulling cord 142 attached to the opposite end of said head assembly. Moving of pulling cord 142 in a back and forth application results in the cleaning of pipe 124. Cloth 140 finishes what the brush 114 started Turning now to FIG. 24, the cleaning device 210 operates in underground pipe 124 of this invention. Cleaning device 210 contains bristle 126 with cloth 140 possibly attached to both ends. Aperture 130 is used to connect bristle 126 to head assembly 132 using connector ring 220. End of head assembly 132 oppositely disposed from bristle 126 is then connected to pulling cord 142 such that brush system 210 can be pulled through pipe 124 and used to clean the pipe.

Figure 25:
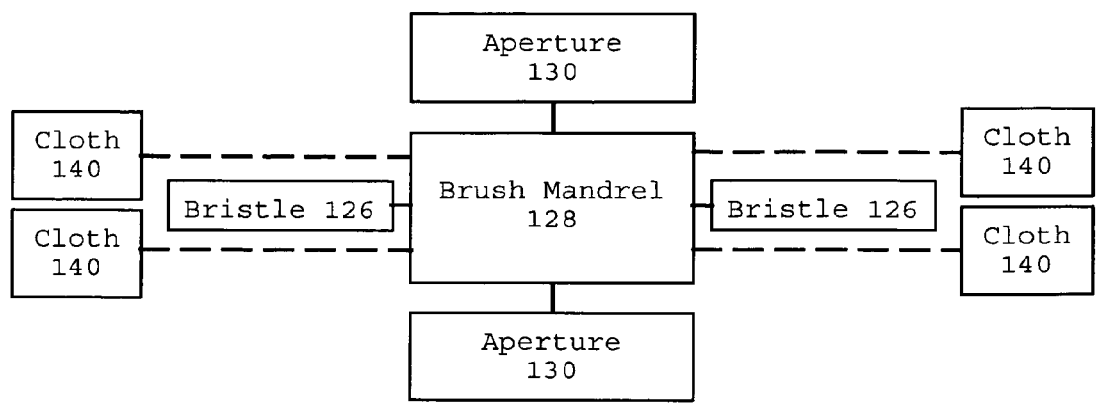
FIG. 25 depicts a block diagram of the brush system 210 used with the cleaning device 200 for an underground pipe of this invention.

For FIG. 25, brush system 210 used with the cleaning device 200 has a brush mandrel 128. Mounted on the brush mandrel 128 are bristles 126. Within the brush mandrel 128, are mandrel apertures 130 in order to facilitate movement of brush system 210 through pipe 124, in order to prepare pipe 124 to receive the repair mechanism. Optionally, cloth 140 may be added to the brush system 210, in order to provide a final cleaning of the pipe 124 prior to repair thereof.

The method of this invention includes clearing the existing leaking pipe 124 of any debris with a pipe cleaning brush 114 and brush head assembly 202 (FIG. 9), and then pulling a highly flexible smooth bore liner 144 with a semi-rigid helix 146 that gives non-collapsible characteristics within the damaged pipe 124 for both linear pipe sections and curved pipe sections up to and including ninety-degree elbows. An existing plastic pipe 124 is usually first cleaned with a specially designed nylon brush 114 and head assembly 202 (FIG. 9). An existing metal pipe 124 is usually first cleaned with a specially designed metal brush 114 and head assembly 202. Under the right circumstances, the brushes of this invention may be used interchangeably.

The pipe cleaning brush 114 has a special steel mandrel 128, with nylon or a metal brush structure. The pipe cleaning brush 114 has a specifically desired length and outside diameter related to the inside diameter of the pipe 124 being cleaned. Typically, these pipes have an inside diameter of 1.5 inches, 2 inches, 3 inches, and 4 inches, whether plastic or metal piping. On the mandrel 128, are two brush head assemblies 202 (FIG. 9) on either side of the brush mandrel 128. This structure permits the brush system 210 to navigate through pipe elbows of up to 90-degree angles, while preventing snagging or jamming.

Then the brush system 210 is subsequently fitted with circular cloth swabs 140, or an equivalent, which are slightly larger in diameter of the brush's bristles. The brush system 210 is again pulled through the existing pipe 124 to clean out all debris. The brush system 210 is pulled through the existing pipe with nylon pulling cords 142 (FIG. 10) connected by stainless steel connector rings 220 (FIG. 9).

The brush system 210 (FIG. 9) is used to sweep any debris out of the pipe 124 to be repaired. Any small debris has the potential of wedging the pipe liner assembly 148 in the existing pipe 124 before the liner assembly 148 can be set into proper position. This is due to the close tolerances between the outside diameter of the pipe liner assembly 148 and the inside diameter of the pipe 124 to be repaired. The brush or fiber part of the brush system 210 has coarse nylon or metal bristles 126 oversized by approximately 0.125 inch for the inside diameter of the existing pipe to be repaired. For example, 1.625 inches diameter bristles 126 permit a 1.5 inches inside diameter pipe 124 to be repaired. The bristles 126 are wrapped around a steel mandrel 128 with an aperture 130 drilled at each end of the brush mandrel 128 to connect a brush head assembly 202 (FIG. 5) at each end with a connector ring 220 (FIG. 8).

A worker at one end of the pipe 124 cooperates with a worker at the opposing end of the pipe 124 in order to brush the interior of the pipe, usually with a back and forth or a seesaw action. Each nylon pulling cord 142 (FIG. 10) is at least the length plus two feet of the existing pipe 124 in order to clean the total length of the pipe 124 completely.

After cleaning, a highly flexible pipe liner assembly 148 for repairing or fixing a pipe 124 has an internal smooth bore 144 with an external, semi-rigid external spherical helix 146 with low coefficient of friction properties. This structure is very effective for underground pipe repair.

While it is not desired to be bound by any particular theory, the following postulate is offered. This helix 146 along with the design of the liner head assembly 240 (FIG. 14) enables the liner 144 not to snag or jam during transit through all straight and curved sections of the damaged pipe 124. The helix 146 also offers non-collapsible characteristics within the existing pipe 124 at linear pipe sections and curved pipe sections up to and including 90 degree elbows.

A designed liner head assembly 240 (FIG. 14) is part of the complete liner head assembly 240 that consists of connector rings 220 and nylon pulling cords 142 (FIG. 10) and similar to that of the brush head assembly 210 (FIG. 9). The liner head assembly 240 is inserted and anchored into the pipe liner assembly 148 opening with three staples 152, preferably metal, each positioned approximately 120 degrees from the other or radially spaced apart. The liner-head assembly 240 (FIG. 14) is connected to the nylon pulling cord 142 (FIG. 10) with a stainless steel connector ring 220 (FIG. 8) that pulls the pipe liner assembly 148 through the existing pipe 124 up to and including right-angled (90 degrees) elbows preventing the liner 144 from snagging or jamming in the existing pipe 124. The pipe liner assembly 148 in itself is at least the total length of the pipe 124 that is being repaired.

In a preferred pipe liner assembly 148 there is a smooth bore 144 polyvinyl chloride pipe liner with an external polyvinylchloride helix 146. The spherical helix 146 is made of a material that gives a low coefficient of resistance or friction. This characteristic is of optimum use to prevent snags and jams while transiting the pipe liner 144 into position. This liner assembly 148 is made in different sizes to repair 1.5 inches, 2 inches, 3 inches, and 4 inches inside diameter pipes. Some helixes 146 are made of stainless steel imbedded in an EPDM (rubber) liner depending upon the size of pipe 124 to be repaired.

A total of two nylon pulling cords 142 (FIG. 10) are used during the repair operation as noted above. They are used in unison and are connected at both ends of the brush head assembly 210 (FIG. 9) to pull the brush 114 to and fro, in order to clear away any existing debris in the pipe 124 to be repaired. This nylon cord 142 (FIG. 10) is a minimum of 0.125 inch in diameter. The length varies. Each cord 142 (FIG. 10) will have a minimum length of the total length plus two feet of the cord 142 based on the pipe 124 to be repaired. One of the pulling cords 142 has a loop 136 at each end finished by a copper crimp 166. The other cord 142 has only one loop 136.

The two-looped cord 142 is used in order to connect to a fish tape that was initially fished through the existing pipe from the opposite end. The connected cord 142 is then pulled back through the pipe 124 with the fish tape to be in position to pull the cleaning brush 114 (FIG. 2), when the opposite ended loop 136 is connected with a stainless steel connector ring 220 to the brush head assembly 210 (FIG. 9). The single looped cord 142 is connected to the other end of the brush head assembly 210 (FIG. 9) with another connector ring 220. One nylon cord 142 is used to pull the pipe liner assembly 148 into place within the damaged pipe 124 by disconnecting the nylon cord 142 (FIG. 10) along with the connector ring 220 from the brush head assembly 210 (FIG. 9) and reattaching it to the liner head assembly 240 (FIG. 14).

The stainless steel spiral connector ring 220 is used to connect brush head assembly 210 (FIG. 9) to both ends of the pipe cleaning brush 114 (FIG. 2) along with the two nylon pulling cords 142 (FIG. 10). The connector ring 220 is also used to connect the liner head assembly 240 (FIG. 14) to a nylon pulling cord 142 (FIG. 10) in order to pull and set the liner assembly 148 into place of the damaged pipe 124.

The final procedure is to anchor the newly inserted liner assembly 148 in the existing leaky pipe 124. The exposed liner head assembly 240 (FIG. 14) pulled through the existing pipe 124 end is severed off by a razor blade at right angles to the length of the pipe liner 144. Two retainer sleeves 158 (FIG. 18), designed to connect and seal the inserted pipe liner 144 to the inlet and outlet ends of the pipe 124 being repaired are implemented.

A retainer sleeve 158 (FIG. 18) is designed to connect an inserted pipe liner assembly 148 to the inlet and outlet ends of the pipe 124 being repaired. This sleeve 158 can vary in size depending upon the size inside diameter of the pipe 124 being repaired and the size of the fittings that connect the existing pipe of the underground main piping system 116 to the main pool drain 122 or other connector.

The retainer sleeve 158 (FIG. 18) may vary in size but are constant in design. A retainer sleeve 158 (FIG. 18) is cylindrical in nature. The end thereof that fits into pipe liner 144 usually has a smaller diameter 154 and is then the end that attaches with the liner 144 to the desired base, as discussed above. Polyvinyl chloride, preferably rigid, is the preferred material. However, sleeve 158 material may change depending upon the pipe 124 to be repaired such as galvanized coated piping, stainless steel, aluminum, nylon, or other plastic type piping.

Polyvinyl chloride cement is applied to the smaller of the two exterior diameter ends 154 of the retainer sleeve 158 (FIG. 18). The sleeve 158 is then inserted into the open end of the liner assembly 148 (FIG. 20) connecting and sealing the interior of the liner assembly 148 to the retainer sleeve 158 (FIG. 18). A special adhesive sealant depending upon the substrates involved is applied to the larger exterior diameter of the retainer sleeve 156 and inserted along with the pipe liner assembly 148 into the existing pipe sealing the liner assembly 148 to the existing pipe 124. This procedure is repeated on the opposite end of the pipe liner 144 to either a straight nominal pipe 124 or an existing pipe 124 connected to a main pool drain 122 or other connector. These polyvinyl chloride sleeves can vary in size depending upon the inside diameter of the pipe being repaired and the size of the fittings that connect the existing pipe 124 to the main pool drain or other type connector.

The sleeves 158 (FIG. 18) may vary in size but are constant in design. Material for sleeves may change depending upon future pipes to be repaired such as stainless steel, galvanized coated metals, aluminum, nylon, or other plastics.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A flexible liner assembly for repairing or reinforcing a pipe comprising:
    (a) the flexible liner assembly having a flexible smooth bore liner and a semi-rigid helix; through the pipe;
    (b) the semi-rigid helix giving the flexible smooth bore liner sufficient strength to cover an inside of the pipe;
    (c) the flexible smooth bore liner covering the inside diameter of the pipe;
    (d) the flexible liner assembly fitting through the pipe and around any curves in the pipe;
    (e) a first sleeve being secured to a first end of the flexible liner assembly and the pipe, wherein the pipe has at least one linear section and at least one curved section;
    (f) a second sleeve being secured to a second end of the flexible liner assembly and the pipe, wherein the pipe has at least one linear section and at least one curved section;
    (g) the flexible liner assembly repairing a leaking member of the pipe, or reinforcing a non leaking member of the pipe;
    (h) the pipe being cleaned with a brush assembly having a brush diameter up to 115 percent of an inside diameter of the pipe in order to provide a first cleaning of the pipe;
    (i) the brush assembly having a first brush end with a second brush end oppositely disposed therefrom; and
    (j) at least one sphere being attached to the first brush end.

2. The flexible liner assembly of claim 1 further comprising:
    (a) the flexible smooth bore liner having reduced friction relative to the pipe in order to provide smooth passage therethrough; and
    (b) the semi-rigid helix flexible smooth bore liner and a semi-rigid helix having reduced friction relative to the pipe in order to provide smooth passage therethrough.

3. The flexible liner assembly of claim 2 further comprising:
    (a) the flexible smooth bore liner assembly having a retainer sleeve; and
    (b) the retainer sleeve connecting the flexible smooth bore liner to the pipe being repaired.

4. The flexible liner assembly of claim 3 further comprising:
    (a) the retainer sleeve connecting the flexible smooth bore liner to at least one end of the pipe; and
    (b) the at least one end of the pipe including an inlet end and an outlet end of the pipe being repaired.

5. The flexible liner assembly of claim 3 further comprising:
    (a) the retainer sleeve having a smaller outside diameter at a smaller end thereof and a larger outside diameter at a larger end thereof;
    (b) the smaller end thereof being oppositely disposed from the larger end;
    (c) the smaller end thereof being insertable and adherable into an inside diameter of the liner assembly; and
    (d) the larger end thereof being insertable and adherable into an inside diameter of the pipe being repaired.

6. The flexible liner assembly of claim 5 further comprising the pipe being cleaned with a brush assembly having a brush diameter up to 110 percent of an inside diameter of the pipe in order to provide a first cleaning of the pipe.

7. The flexible liner assembly of claim 6 further comprising the pipe being cleaned with a brush assembly having a brush diameter up to 109 percent of an inside diameter of the pipe in order to provide a first cleaning of the pipe.

8. The flexible liner assembly of claim 7 further comprising the pipe being cleaned with a cloth cleaning swab having a swab radius up to 115 percent of an inside diameter of the pipe in order to provide a second cleaning of the pipe.

9. The flexible liner assembly of claim 8 further comprising the pipe being cleaned with a cloth cleaning swab having a swab radius up to 109 percent of an inside diameter of the pipe in order to provide a second cleaning of the pipe.

10. The flexible liner assembly of claim 7 further comprising the pipe being cleaned with a cloth cleaning swab having a swab radius up to 109 percent of an inside diameter of the pipe in order to provide a second cleaning of the pipe.

11. The flexible liner assembly of claim 1 further comprising the pipe being cleaned with a cloth cleaning swab having a swab radius up to 115 percent of an inside diameter of the pipe in order to provide a second cleaning of the pipe.

12. A flexible liner assembly for repairing or reinforcing a pipe comprising:
   (a) the flexible liner assembly having a flexible smooth bore liner and a semi-rigid helix; through the pipe;
   (b) the semi-rigid helix giving the flexible smooth bore liner sufficient strength to cover an inside of the pipe;
   (c) the flexible smooth bore liner covering the inside diameter of the pipe;
   (d) the flexible liner assembly fitting through the pipe and around any curves in the pipe;
   (e) a first sleeve being secured to a first end of the flexible liner assembly and the pipe, wherein the pipe has at least one linear section and at least one curved section;
   (f) a second sleeve being secured to a second end of the flexible liner assembly and the pipe, wherein the pipe has at least one linear section and at least one curved section;
   (g) the flexible liner assembly repairing a leaking member of the pipe, or reinforcing a non leaking member of the pipe;
   (h) the flexible smooth bore liner assembly having a retainer sleeve;
   (i) the retainer sleeve connecting the flexible smooth bore liner to the pipe being repaired;
   (j) the retainer sleeve connecting the flexible smooth bore liner to at least one end of the pipe;
   (k) the at least one end of the pipe including an inlet end and an outlet end of the pipe being repaired;
   (l) the retainer sleeve having a smaller outside diameter at a smaller end thereof and a larger outside diameter at a larger end thereof;
   (m) the smaller end thereof being oppositely disposed from the larger end;
   (n) the smaller end thereof being insertable and adherable into an inside diameter of the liner assembly; and
   (o) the larger end thereof being insertable and adherable into an inside diameter of the pipe being repaired.

13. The flexible liner assembly of claim 12 further comprising:
   (a) the flexible smooth bore liner having reduced friction relative to the pipe in order to provide smooth passage therethrough; and
   (b) the semi-rigid helix flexible smooth bore liner and a semi-rigid helix having reduced friction relative to the pipe in order to provide smooth passage therethrough;
   (a) the flexible smooth bore liner assembly having a retainer sleeve; and
   (b) the retainer sleeve connecting the flexible smooth bore liner to the pipe being repaired.

14. The flexible liner assembly of claim 13 further comprising:
   (a) the retainer sleeve connecting the flexible smooth bore liner to at least one end of the pipe; and
   (b) the at least one end of the pipe including an inlet end and an outlet end of the pipe being repaired.

* * * * *